Sept. 22, 1931.      W. H. BRESNAHAN      1,824,654
OUTER SOLE AND METHOD OF PREPARING THE SAME
Filed April 19, 1929      2 Sheets-Sheet 2

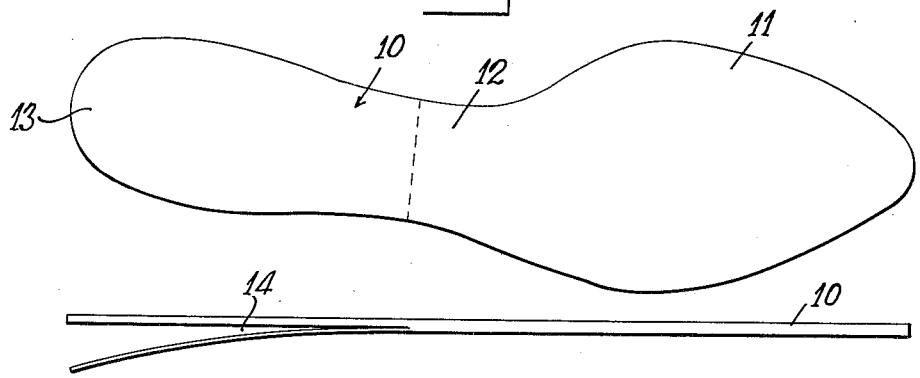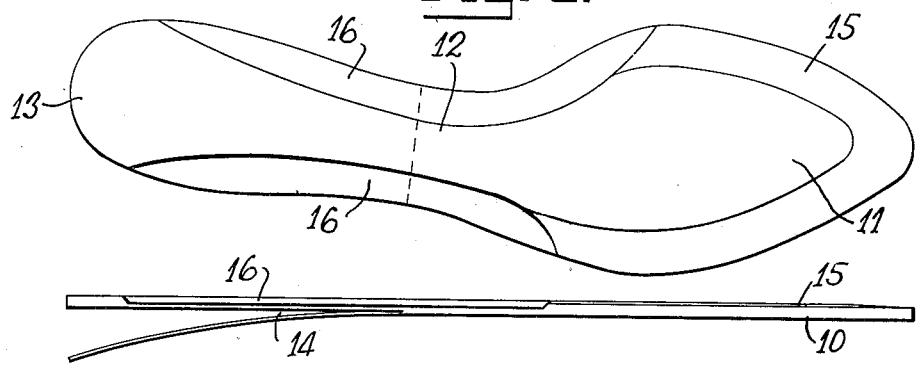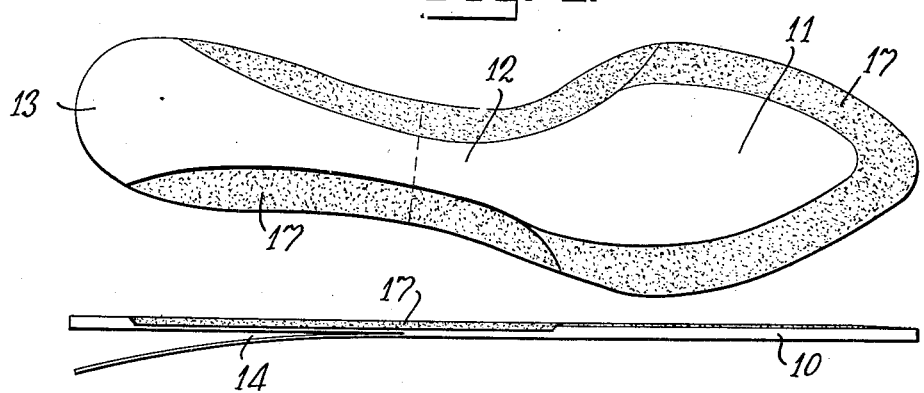

Inventor
William H. Bresnahan
By his Attorneys
Warfield & Watson

Patented Sept. 22, 1931

1,824,654

UNITED STATES PATENT OFFICE

WILLIAM H. BRESNAHAN, OF LYNN, MASSACHUSETTS, ASSIGNOR TO COMPO SHOE MACHINERY CORPORATION, OF NEW YORK, N. Y., A CORPORATION OF DELAWARE

OUTER SOLE AND METHOD OF PREPARING THE SAME

Application filed April 19, 1929. Serial No. 356,385.

This invention relates to outer soles and to methods of preparing the same for use in the manufacture of shoes by a process in which the outer soles are adhesively permanently secured to the lasted upper instead of being stitched, tacked or stapled in the manner heretofore generally in use.

A general object of the invention is to provide an efficient and economical method of preparing outer soles for the purposes aforesaid in a manner such that the sole will securely and uniformly adhere to the lasted upper in certain desired areas, but will not adhere at certain other areas.

A more specific object of the invention is to provide an outer sole which is preformed for uniform and substantially maximum contact with a lasted shoe upper and which is precoated with an adhesive cement so that the upper will adhere thereto throughout the shank-portion and at least marginally around the fore part, leaving the edges, and preferably also the center of the ball-portion, free with respect to said upper.

Other objects of the invention will in part be obvious and will in part appear hereinafter.

The invention accordingly comprises the several steps and the relation of one or more of such steps with respect to each of the others, and the article possessing the features, properties and the relation of elements which are exemplified in the following detailed disclosure, and the scope of the application of which will be indicated in the claims.

Figure 4:
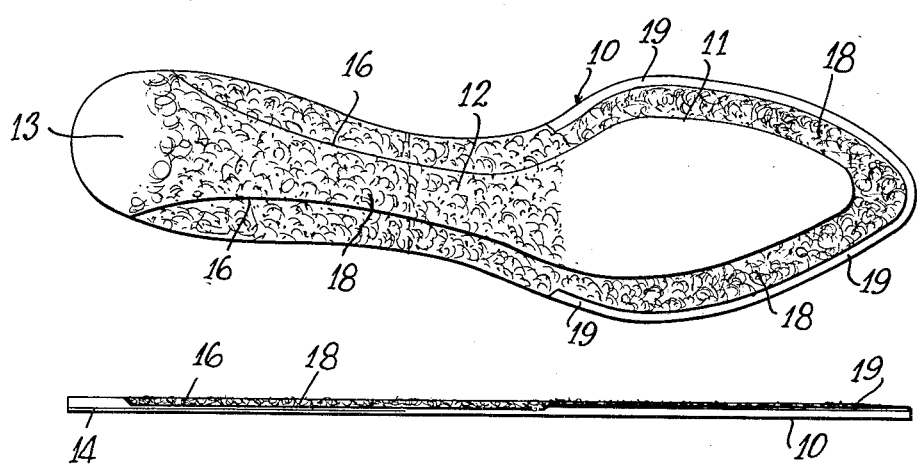
Figure 5:
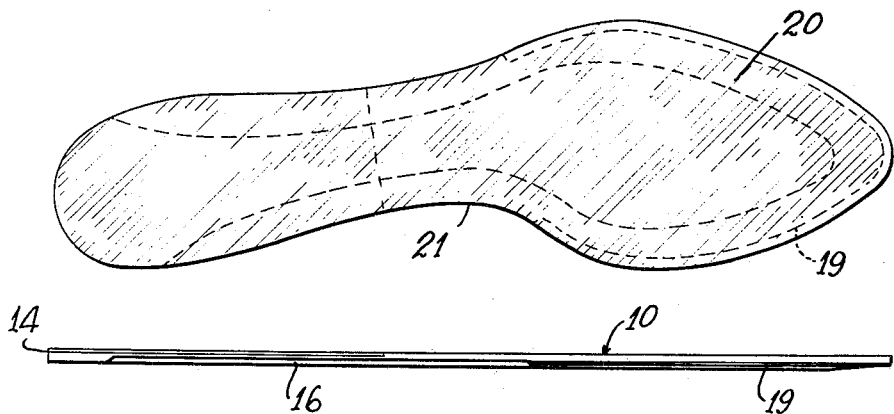

For a fuller understanding of the nature and objects of the invention reference should be had to the following detailed description taken in connection with the accompanying drawings exemplifying the invention, in which:

Figures 1 to 4 inclusive are each detail composite plan and side elevational views in projection showing steps in the preparation of one type of outer sole; and Fig. 5 is a similar detail view showing an outer sole, having certain additional features.

The principles of the present invention are applicable generally to footwear, but for simplicity of illustration the drawings and specification are confined to outer soles for women's shoes of the Louis wood heel type. It is therefore to be understood that the word "shoes" as used in the specification and subjoined claims is intended, whenever the context permits, to include other types of footwear, such as, for example, women's shoes of the Cuban wood heel type, men's and children's shoes, boots, lounging slippers and the like.

Referring more particularly to the drawings, Fig. 1 illustrates an outer sole 10 which has been rounded out of a blank piece of leather to form a fore part 11, shank-portion 12 and heel-portion 13. Also, as is shown in the side elevational portion of Fig. 1, the sole is split on the under side as at 14 for the wood heel.

As shown in Fig. 2, the sole is next reduced or fleshed slightly as at 15 on its upper side around the margin of the fore part 11 to insure a uniform thickness and an even contact with the corresponding portions of the lasted upper.

Also, as shown in Fig. 2, the upper side of the sole is shanked out or beveled at 16 along the margins of the shank-portion 12, the shanking-out cut extending from the ends of the reduced portion 15 well back to the heel-portion 13. Such beveling allows of the central portion of the shank-portion 12 seating closely against the shank of the lasted upper, and the beveled edges 16 may be readily forced up against the lasted upper to insure uniform contact and good adhesion.

As shown in Fig. 3, the reduced and shanked-out marginal portions of the sole are next preferably subjected to a roughing operation 17 which may be readily accomplished by passing them under a rapidly-rotating head bearing small needle points which penetrate into the leather for a short distance and loosen up the fibers to facilitate the penetration of the adhesive cement and to provide a nap which will subsequently strongly knit or mat with the lasted upper. The roughed marginal portions, and, preferably, the entire upper surface of the shank-portion 12, are then coated with an adhesive cement 18, preferably of the pyroxylin type, which is then allowed to dry. Thereafter, as is shown in Fig. 4, a small strip of cement or cement and leather is removed from the cemented margin of the fore part, as indicated at 19, in order to prevent the extreme outer edge of the fore part of the sole from adhering to the lasted upper when the sole is adhesively secured thereto, and in order to present an edge which may be trimmed, set and burnished in the usual manner.

As is indicated in the above description, the usual method of manufacturing shoes with outer soles adhesively secured to the lasted uppers includes precoating the various adhering portions with cement, which is then allowed to dry and is softened either by the application of a new coat of cement or of a cement-solvent just prior to the affixing operation, which latter is accomplished by forcing the outer sole against the lasted upper by means including a pressure pad.

It is broadly within the contemplation of the present invention to provide an outer sole prepared as aforesaid for permanent and uniform adhesion to a lasted upper, said sole having adhesive applied to the marginal portions of the fore part and having the outer margin of said fore part free from adhesive, regardless of the manner by which this end is accomplished.

In Fig. 5 there is exemplified an outer sole having certain additional characteristics, to the application of which the adhesive process readily lends itself. After the reducing, beveling, cementing and strip-removing operations above described are completed, this sole is completely finished on the bottom side by lacquering as at 20 and has its edges trimmed and burnished as at 21, so that when the sole-affixing operation is completed the shoe is complete, with the exception of the heeling operations—when heels are used. This type of outer sole is particularly adapted for use in connection with the manufacture of lounging slippers, and, as will be readily understood, the use thereof in constructing any shoe permits the elimination of the trimming, setting, burnishing and other operations usually following the attachment of the outer sole to the upper, during which there is always danger of injuring the upper.

It will thus be seen that by the principles of the present invention there has been provided a method and an article which presents novel and useful features in connection with the manufacture of shoes in which the soles are adhesively secured to the lasted uppers, and since certain changes in carrying out the above process, and certain modifications in the article which embody the invention may be made, without departing from its scope, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent is:

1. A method of preparing an outer sole adapted for permanent attachment to a lasted upper by adhesive cement, which includes applying adhesive cement to the marginal portion of the fore part of a sole, and thereafter removing a marginal strip from said cemented portion.

2. A method of preparing an outer sole adapted for permanent attachment to a lasted upper by adhesive cement, which includes, in combination, rounding out a sole, slightly reducing the marginal portion of the fore part of the sole on the flesh side, applying adhesive cement to said reduced portion, and thereafter removing a marginal strip from said cemented portion.

3. A method of preparing an outer sole adapted for permanent attachment to a lasted upper by adhesive cement, which includes, in combination, rounding out a sole, slightly reducing the marginal portion of the fore part of the sole on the flesh side, beveling the margins of the shank-portion of the sole on the flesh side, applying adhesive cement to the reduced and beveled portions, and thereafter removing a marginal strip from the cemented portion of the fore part.

4. A method of preparing an outer sole adapted for permanent attachment to a lasted upper by adhesive cement, which includes, in combination, rounding out a sole, slightly reducing the marginal portion of the fore part of the sole on the flesh side, roughing the marginal portions of the shank and fore part, applying adhesive cement to said roughed portions, and thereafter removing a marginal strip from the cemented portion of the fore part.

5. A method of preparing an outer sole adapted for permanent attachment to a lasted upper by adhesive cement, which includes, in combination, rounding out a sole, slightly reducing the marginal portion of the fore part of the sole on the flesh side, roughing the marginal portions of the shank and fore part, applying adhesive cement to said roughed portions, thereafter removing a marginal strip from the cemented portion of the fore part, trimming, setting and burnishing the entire edge of the sole, and applying lacquer to the bottom thereof to provide a prefinished outer sole.

6. A new article of manufacture, comprising an outer sole adapted for permanent attachment to a lasted upper by adhesive cement, said sole having its fore part slightly and substantially uniformly reduced marginally on the flesh side, said reduced portion being coated with adhesive cement, the outer margin of said reduced portion being free from cement.

7. A new article of manufacture, comprising an outer sole adapted for permanent attachment to a lasted upper by adhesive cement, said sole having its fore part slightly reduced marginally on the flesh side, said reduced portion being coated with adhesive cement, the outer margin of said reduced portion and the ball-portion of the fore part being free from cement; said sole also having its shank coated throughout with an adhesive cement.

8. A new article of manufacture, comprising an outer sole adapted for permanent attachment to a lasted upper by adhesive cement, said sole having the margin of the upper side of its fore part fleshed and coated with an adhesive cement for a width sufficient to form a firm and permanent union between said lasted upper and said outer sole, and a cement free strip upon the outer edge of said marginal portion said outer edge being slightly less thick than said fleshed portion.

9. A new article of manufacture, comprising an outer sole adapted for permanent attachment to a lasted upper by adhesive cement, said sole having its fore part slightly reduced marginally, and having the marginal portions of the shank and forepart roughed, such roughed portions having thereon a coating of adhesive cement which approaches but does not reach the periphery of the forepart of said sole whereby the outer edge of the marginal portion of said forepart is free of cement, the edge of said sole being trimmed and finished.

10. A method of preparing an outer sole adapted for permanent attachment to a lasted upper by adhesive cement, which includes, in combination, rounding out a sole, slightly reducing the marginal portion of the fore part of the sole on the flesh side, beveling the margins of the shank-portion of the sole on the flesh side, roughing said reduced and beveled portions and applying adhesive cement thereto, and thereafter removing a marginal strip from the cemented portion of the fore part.

In testimony whereof I affix my signature.

WILLIAM H. BRESNAHAN.